United States Patent
Lunev et al.

(10) Patent No.: US 10,037,334 B1
(45) Date of Patent: Jul. 31, 2018

(54) MEMORY MANAGEMENT AND SHARING HOST OS FILES FOR VIRTUAL MACHINES USING EXECUTION-IN-PLACE

(71) Applicant: Parallels International GmbH, Schaffhausen (CH)

(72) Inventors: Denis Lunev, Moscow (RU); Alexey Kobets, Seattle, WA (US)

(73) Assignee: Parallels International GmbH, Schaffhausen (CH)

( * ) Notice: Subject to any disclaimer, the term of this patent is extended or adjusted under 35 U.S.C. 154(b) by 30 days.

(21) Appl. No.: 15/390,589

(22) Filed: Dec. 26, 2016

(51) Int. Cl.
  G06F 17/30 (2006.01)
  G06F 3/06 (2006.01)

(52) U.S. Cl.
  CPC ...... *G06F 17/30138* (2013.01); *G06F 3/0604* (2013.01); *G06F 3/064* (2013.01); *G06F 3/0644* (2013.01); *G06F 3/0659* (2013.01); *G06F 3/0664* (2013.01); *G06F 3/0683* (2013.01); *G06F 17/30233* (2013.01)

(58) Field of Classification Search
  CPC ......... G06F 17/30138; G06F 17/30233; G06F 3/0604; G06F 3/064; G06F 3/0644; G06F 3/0659; G06F 3/0664; G06F 3/0683
  USPC ...... 711/153, 147, 154; 707/625; 718/1, 100
  See application file for complete search history.

(56) References Cited

U.S. PATENT DOCUMENTS

| | | | | |
|---|---|---|---|---|
| 7,356,679 B1 * | 4/2008 | Le | ...... | G06F 17/30067 707/E17.01 |
| 8,209,680 B1 * | 6/2012 | Le | ...... | G06F 17/30067 713/1 |
| 8,869,139 B2 * | 10/2014 | Le | ...... | G06F 17/30067 713/1 |
| 8,973,019 B1 * | 3/2015 | Lunev | ...... | G06F 9/45545 719/327 |
| 9,122,505 B1 * | 9/2015 | Lunev | ...... | G06F 9/45545 |
| 9,286,310 B1 * | 3/2016 | Emelyanov | ...... | G06F 17/30132 |
| 9,311,313 B2 * | 4/2016 | Le | ...... | G06F 17/30067 |
| 9,430,265 B1 * | 8/2016 | Lunev | ...... | G06F 9/45545 |
| 9,569,124 B2 * | 2/2017 | Jain | ...... | G06F 3/0619 |
| 9,766,915 B1 * | 9/2017 | Emelyanov | ...... | G06F 9/45545 |
| 2015/0067283 A1 * | 3/2015 | Basu | ...... | G06F 3/061 711/162 |
| 2016/0110291 A1 * | 4/2016 | Gordon | ...... | G06F 12/126 711/6 |

\* cited by examiner

*Primary Examiner* — Midys Rojas
*Assistant Examiner* — Marwan Ayash
(74) *Attorney, Agent, or Firm* — Bardmesser Law Group (57) ABSTRACT

A system for memory management for Virtual Machines (VMs), including a host computer system running a host operating system (OS); at least two Virtual Machines (VMs) running on the host computer system, wherein each of the VMs has a Guest OS supporting a guest file system with execution-in-place that allows code execution without an intermediate buffer cache; a hypervisor configured to control the VMs; and a thin provisioning block device configured to store shared pages and formed of at least one delta file. The hypervisor is configured to receive a page fault, and to read the shared pages from the thin provisioning block device. The Guest OS executes the file that is stored on the thin provisioning block device.

16 Claims, 9 Drawing Sheets

MEMORY MANAGEMENT AND SHARING HOST OS FILES FOR VIRTUAL MACHINES USING EXECUTION-IN-PLACE

BACKGROUND OF THE INVENTION

Field of the Invention

The present invention is related to Virtual Machines (VMs) and, in particular, to a method for Virtual Machine memory deduplication and reducing the amount of I/O operations required by the VMs.

Description of the Related Art

Virtual Machines have low density (as compared to Containers) due to the fact that each VM uses its own set of files, even when the files are identical. The files have to be loaded for each of the VMs, and usually the VMs do not share memory. In order to share memory between VMs, all pages have to be scanned to determine which pages can be shared. This can be a long and inefficient process. It is desired to have shared memory for VMs right upon their creation. INTEL™ Clear Container scheme takes a loop-back file (containing a raw disk image) from the host and reflects it to other guest physical addresses. This file is common and cannot be changed, therefore the physical pages are common. The pages are mapped through the page table.

A method for reducing the amount of RAM used by several VMs is desired. It can be used either for improving the density of VMs on physical host or for deduplication of I/O. The case of many VMs running on the same physical host is very common. If the total amount of memory needed by the VMs is more than the amount of RAM physically available on the host, performance of the system reduces often drastically. At the same time, there are pages in the system that are similar (or the same) in some VMs. The common approach is to scan host physical memory in order to find similar (or identical) pages belonging to different VMs, merge them to one physical page on the host, and, then, use a copy-on-write technique in case of a write operation in one of the corresponding guest physical pages.

However, the scanning is a slow and CPU intensive process, which cannot solve the entire issue of saving memory. Another conventional approach is using the same operating system in all of the VMs. In this case the parts of memory that are similar to all the VMs are known ahead of time. These parts of virtual memory of the guests are mapped to one host physical memory region. However, such a physical memory region becomes copy-on-write (i.e., read-only, and copied when something is to be written to the page), and no changes can be saved onto the disk.

Figure 1:
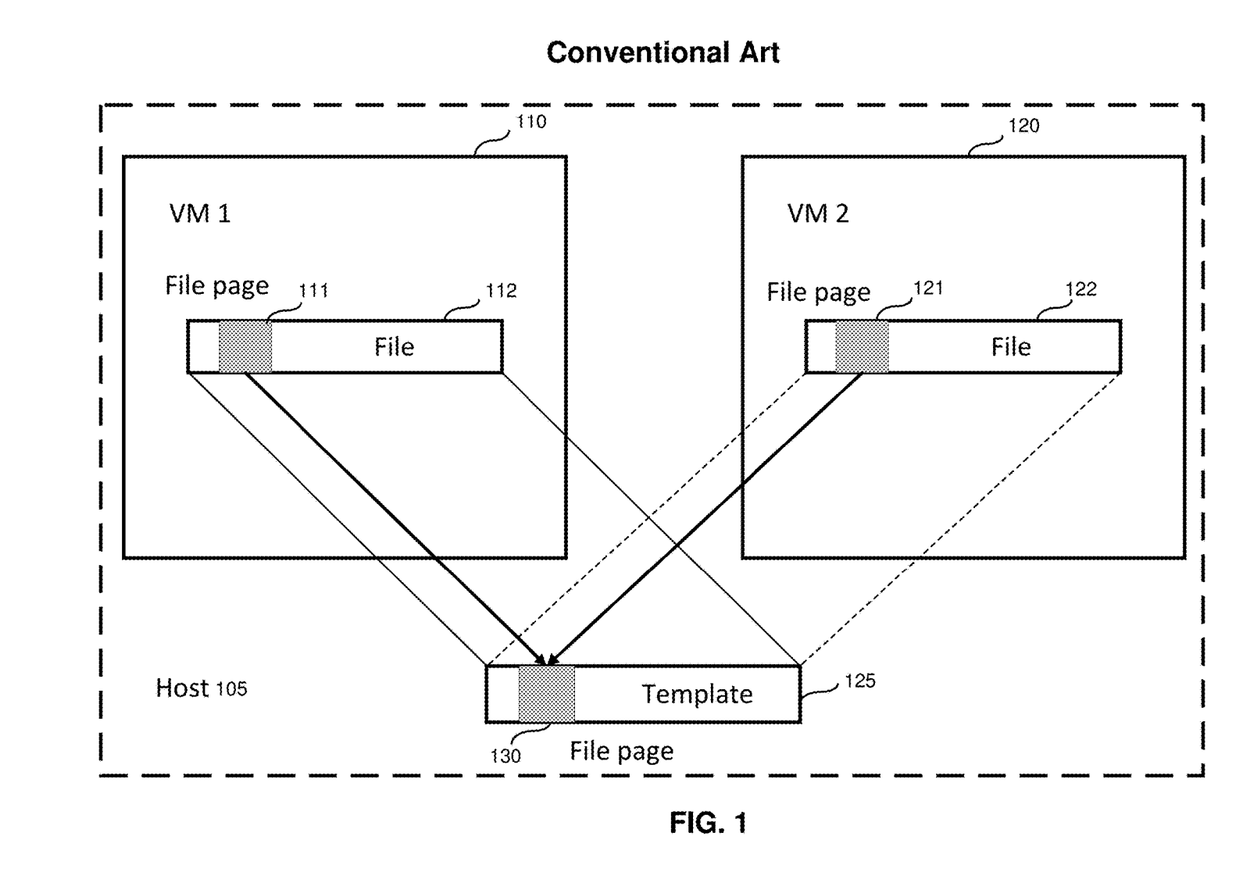
FIG. 1 illustrates a conventional system for sharing host OS files among the VMs.

FIG. 1 illustrates a conventional system for sharing files between the VMs. In FIG. 1, VM 1 (110) and VM 2 (120) share one or several files. The shared file 125 is visible (in VM 1 as file 112 and in VM 2 as file 122) and can be executed on each of the VMs. The guest files (112 and 122) are mapped to the host file 125 (referred to as a template). The template 125 is a block device or raw file on the host 105. So the same pages of the file in VMs (111 and 121) are mapped to one page in the template (130). The physical pages (e.g. 130) of the template are marked copy-on-write (COW) to prevent data corruption in one of the VMs because of behavior of other VMs. To allow the guest to execute the file 112 on the guest disk, the file 112 must be mapped to the guest RAM.

Figure 2:
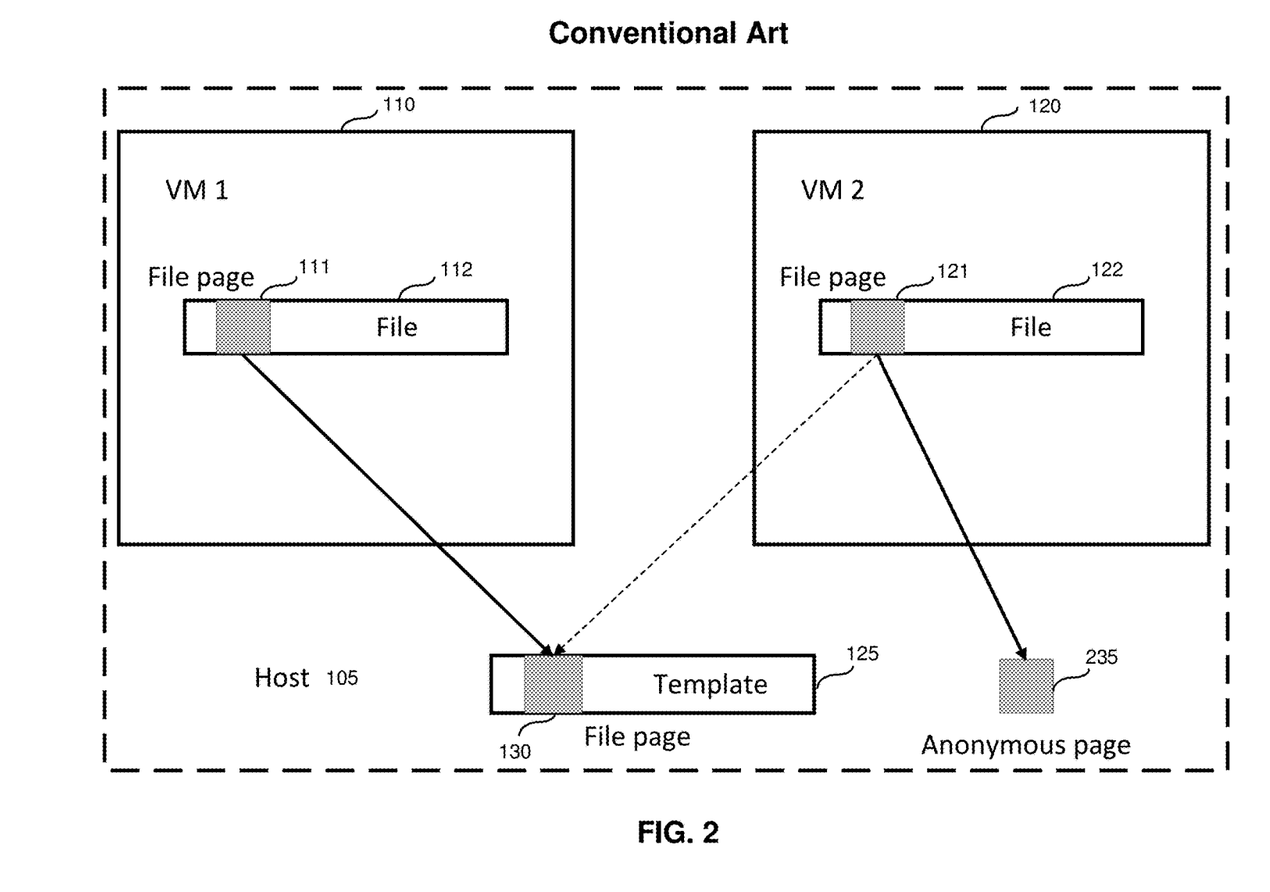
FIG. 2 illustrates a conventional write operation to shared file.

FIG. 2 illustrates a conventional write operation to a shared file. FIG. 2 illustrates what happens when the second VM 120 attempts to write to any page (e.g., 121) in the shared file (125) depicted in FIG. 1. In this case the page 121 becomes unshared for this VM and it is unmapped from the template. In the host 105, the corresponding physical page (130) is copied. Then, the virtual page (121) of the second VM 120 becomes mapped to the newly created copy in the host (235). The newly created page (235) is an anonymous page. If a third guest (VM) attempts to write to the page, its own unshared anonymous page appears in the host 105.

In Linux™, kernel pages can be mapped to the files or can be anonymous. If the page is mapped to a file, it means that when it is necessary to unload the page from memory, the page goes to the corresponding file on the disk. In case of anonymous pages (like 235), when the page is needed to be unloaded from memory, it must go to swap, as it is not tied to any file.

The main problem is that in case of guest halting, the anonymous page is not written to the disk. This page does not get saved and all the data changes are lost, because the page does not have any file mapping.

Accordingly, it is desired to have an efficient method for sharing host OS files among multiple VMs running on the host using execution in place mechanism.

SUMMARY OF THE INVENTION

The present invention is related to Virtual Machines (VMs) and, in particular, to a method for managing memory of the VMs using an execution in place mechanism that substantially overcomes the disadvantages of the related art.

According to an exemplary embodiment, a method, system and computer program for memory management for Virtual Machines (VMs), including a host computer system running a host operating system (OS); at least two Virtual Machines (VMs) running on the host computer system, wherein each of the VMs has a Guest OS supporting a guest file system with execution-in-place that allows code execution without an intermediate buffer cache; a hypervisor configured to control the VMs; and a thin provisioning block device configured to store shared pages and formed of at least one delta file. The hypervisor is configured to receive a page fault, and to read the shared pages from the thin provisioning block device. The Guest OS executes the file that is stored on the thin provisioning block device.

Optionally, the ploop provides a translation for the page access from a read/write delta or from a read-only template. Optionally, each VM has a corresponding ploop device. Optionally, the ploop device is union of several delta files. Optionally, the delta files that are shared by multiple ploops of different VMs, and wherein the delta files are read-only and include templates that contain pages of a file that are shared by the VM. Optionally, the delta files that are unique for the particular ploop include unshared pages and represent R/W (read/write) deltas. Optionally, a VM can write to the unshared pages, and when the VM attempts to write to a shared page, that page is copied from a R/O (read/only) template to the R/W (read/write) delta and the VM uses the copy from the R/W (read/write) delta to write to it.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.\

According to an exemplary embodiment, a method and system for Virtual Machine memory deduplication and reducing the amount of I/O operations required by the VMs is provided. In one aspect of the invention, a ploop is used. Ploop is a Parallels loop device—i.e., a thin provisioning block device. A conventional loopback device requires to create the file with the length equal to the block device size. Though this file could be sparse and thus thinly provisioned, this approach will result in bad data locality after some usage time. This leads to a poor performance. Ploop device consists of several layers, which are stored in files named 'delta' files. All deltas are read-only except the top read-write delta. The ploop supports modular architecture, different file formats ("plain", QCOW2, etc.), network storage (NFS), snapshots and fast provisioning via stacked images, and a write tracker for faster live migration.

The ploop is a disk loopback block device (not unlike a loop), but with many additional features, such as dynamic resize, snapshots, backups, stackable images, etc. The main idea of ploop is to have an image file, use it as a block device, and create and use a file system on that device. The main goal is that the created file (image) is viewed by the host OS as a virtual disk. Both ploop and LINUX Loop can facilitate this. However, ploop optimizes the process and can store compacted data reflecting the disk inside the file disk image more efficiently. The blocks that do not contain useful data are considered to be empty by the guest OS. However, the block device (i.e., ploop) appears to the VM as a complete disk. The ploop allows for creation of a snapshot tree.

Ploop implementation in the kernel have a modular and layered design. The top layer is the main ploop module, which provides a virtual block device to be used for CT filesystem. The middle layer is the format module, which does translation of block device block numbers into image file block numbers. A simple format module which is called "raw" is doing trivial 1:1 translation, same as existing loop device. More sophisticated format module is keeping the translation table and is able to dynamically grow and shrink the image file. That means, if a user creates a container with 2 GB of disk space, the image file size will not be 2 GB, but less—the size of the actual data stored in the container. It is also possible to support other image formats by writing other ploop format modules, such as the one for QEMU Copy On Write 2 (QCOW2) (used by QEMU (Quick Emulator) and KVM (kernel virtual machine)). The bottom layer is the I/O (input/output) module, providing direct I/O on several file systems.

In one aspect a base image (the first delta, or so called template), the unchanged version of file (the same for all of the VMs) is viewed by ploop as read-only. Then, for each of the VMs, the VM-specific delta is added. Then, the delta can be made read/write. In some aspects the thin provisional device (e.g., a ploop) can have only one read only (R/O) delta.

In some embodiments, the thin provisioning block device (e.g., ploop) is stored on the disk on the host. When the VMs are working, the thin provisioning block device is mapped to the host address space (e.g., to host memory). These range of addresses of the host address space is presented in the guest as an NVDIM memory device. So the guest can perform execution in place (XIP) of the any file stored on the thin provisioning block device. This means that code can be executed just after reading instructions from NVDIM block device without previously copying them to any intermediate buffer cache (e.g., to any range of addresses of the guest address space). Such an intermediate buffer cache in the guest would have to be allocated from conventional guest RAM, thus the amount of memory used in the guest is effectively doubled. The difference is much more significant when the device is shared in between several guests. This difference becomes very considerable when hundreds of guests are running on the same hardware node.

Figure 3:
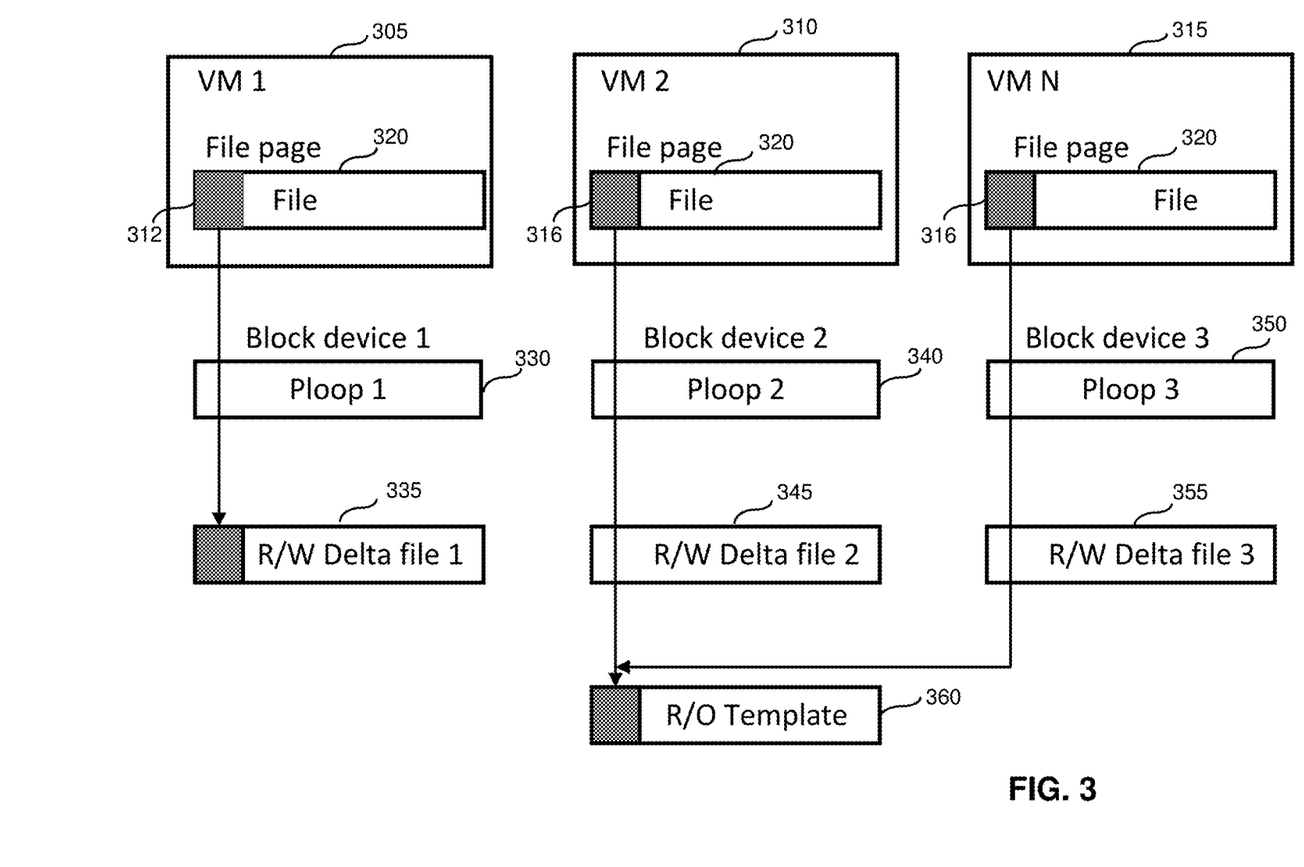
FIG. 3 illustrates guest page mappings, in accordance with the exemplary embodiment.

FIG. 3 illustrates guest page mappings, in accordance with the exemplary embodiment. It also shows main objects forming the system. There are several VMs (VM 1 (301), VM 2 (302), . . . , VM N (303)) operating on the host. There is a file shared between VMs, so that each of the VMs has a file 320. The files 320 are identical and are mapped into one read-only template file 360 in the host.

Each VM uses a corresponding ploop (or other virtual block device), which can consist of several deltas, see, e.g., U.S. Pat. No. 9,286,310, incorporated herein by reference in its entirety, for a discussion of ploops. The Ploop 1 (330) corresponds to VM 1 (301), the Ploop 1 (340) corresponds to VM 1 (302), the Ploop 1 (350) corresponds to VM 1 (303). In the simplest case, shown on the FIG. 3 each ploop (330, 340, 350) is a union of a read only delta (called template (360), shared by all ploops) and read-write delta (335, 345, 355 corresponding to a VM). The read-only template (360) stores the initial version of the shared file (320). Each read-write delta (335, 345, 355) contains pages that were changed by corresponding VM. So the read-only template provides pages of the file, that are shared between VMs, and read-write deltas provide pages that are unique for corresponding VMs, i.e. unshared.

Ploop provides a translation (file mappings) of pages of the file 320 in VM. Shared pages are taken from R/O template and unique pages are taken from R/W delta. So ploop device provides all pages needed for the corresponding VM. While looking for the page ploop, the system first looks in the R/W delta, if finds—uses it, and if does not find it—looks for this page in the template.

Initially, all VMs used the same file (template (360)) and all the read write (R/W) deltas were empty. When any VM (e.g. VM 1 (301)) tries to write something to any page (e.g. 312) in the shared file 320, the corresponding page of the template (370) is copied to the R/W delta corresponding to the VM (R/W delta (335) of ploop 1 (330)). The copy is an unshared page (380). Then this VM (VM 1 (301)) can write to this page (312, which is mapped to 380).

The FIG. 3 shows the situation after VM 1 (301) changed the page (312). Pages 312 and 316 of the files 320 in each VM are provided by the ploop devices 330, 340 and 350. The ploop device contains a combination of the template 360 and a respective read-write delta 335, 345 and 355. So the pages of this file can be located either in the template 360 or in the read-write delta 335, 345 and 355. In case of VM 2 (302) and VM N (303), the page 316 is shared (and belongs to read-only (R/O) template, page 370), and in case of VM 1 (301), the page 312 is not shared and the page belongs to the delta 335 (page 380).

If VM 2 (302) addresses (e.g. for read, execution, etc.) the unmodified page 316, the system looks for this page in ploop 340: first in the R/W delta, then in R/O template. There is no such page in the delta file (345). So the page is taken from the template (360). So VM 2 uses the page 370 from the template (360). This page is shared. If VM 1 (301) attempts to address the modified page 312 (which initially was the same as 316, but then was modified by the VM 1), the system looks for this page in ploop 330: first in the R/W delta, then in R/O template. In this case the modified page 312 is in delta 335, so VM 1 uses the page 380 from delta and do not use the page 370 from the template.

The difference between the conventional system (see FIG. 2) and the system depicted in FIG. 3 is that in FIG. 3 the changed file pages now belong to R/W delta and are not anonymous any more. Instead, they have file mapping. All the pages that were shared are still shared, and the pages that were private still remain private. So the pages can be saved to the disk and all the changes are saved.

Consequently, ploop device provides all pages needed for the corresponding VM. Now even the pages that were changed by VM are tied to files (R/W deltas), and are not anonymous. So when the VM will be stopped all the changed will be saved.

Figure 4:
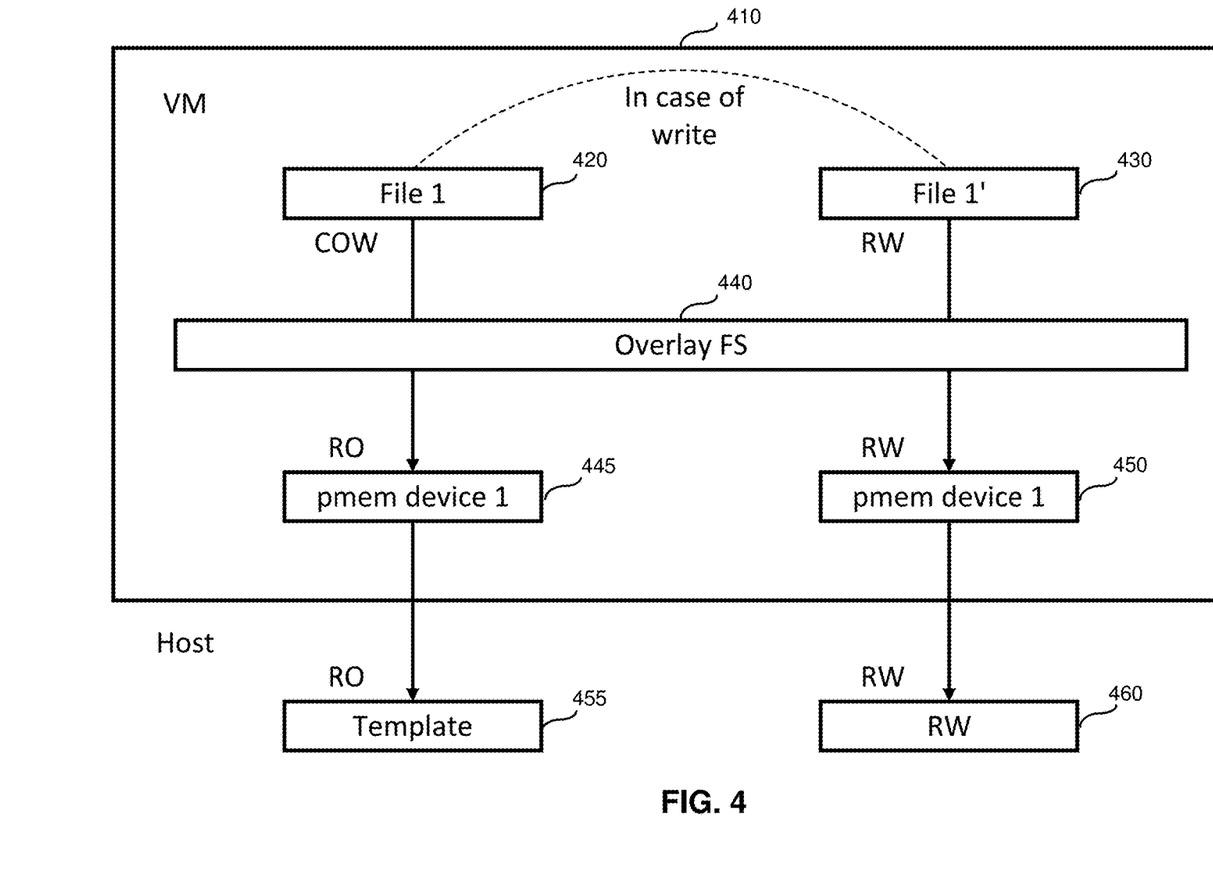
FIG. 4 illustrates a state of an exemplary system at a particular moment.

FIG. 4 illustrates a state of an exemplary system at a particular moment. If an unmodified page 417 from a file 415 in VM 1 (401) is required, the system looks for this page in ploop 1 (435). If the page is not found in a delta file 450, the system takes this page from a template 465 and the page 417 is shared. The situation is the same for the VM N (403). If the page is not found in a delta file 445, the system takes this page 417 from a template 465 and the page 417 is shared.

However, for VM 2 (402) the situation is different. In this example, the VM 402 has a modified page 417 in file 420. The VM 402 has a page 417 that was modified, so the page 417 is private and is located in read-write delta 2 (455). When the VM 402 attempts to address the page 417, the page is searched in the ploop 440: first in the delta file 455 and then, if the page was not found in the delta 455, in the template 465. In this case the modified page 417 is in the delta 455, so the VM 402 uses the page 417 from the delta 455 and does not use the page 417 from the template 465. So the page 417 is not shared in this example.

According to the exemplary embodiment, when the VMs are be stopped, all the modified pages (e.g., 417 in VM 2) are saved to the disk. Note that these pages belong to the delta files—i.e., they are not anonymous. For example, the page 417 in the file 415 does not exist in the delta 450, but exists in the read-only template 465. A physical page "exists" (i.e., referenced) in the ploop in all cases. Note that the ploop itself does not contain any pages. Instead, it provides a translation, so the page can be accessed from the read-write delta or from the read-only template.

Figure 5:
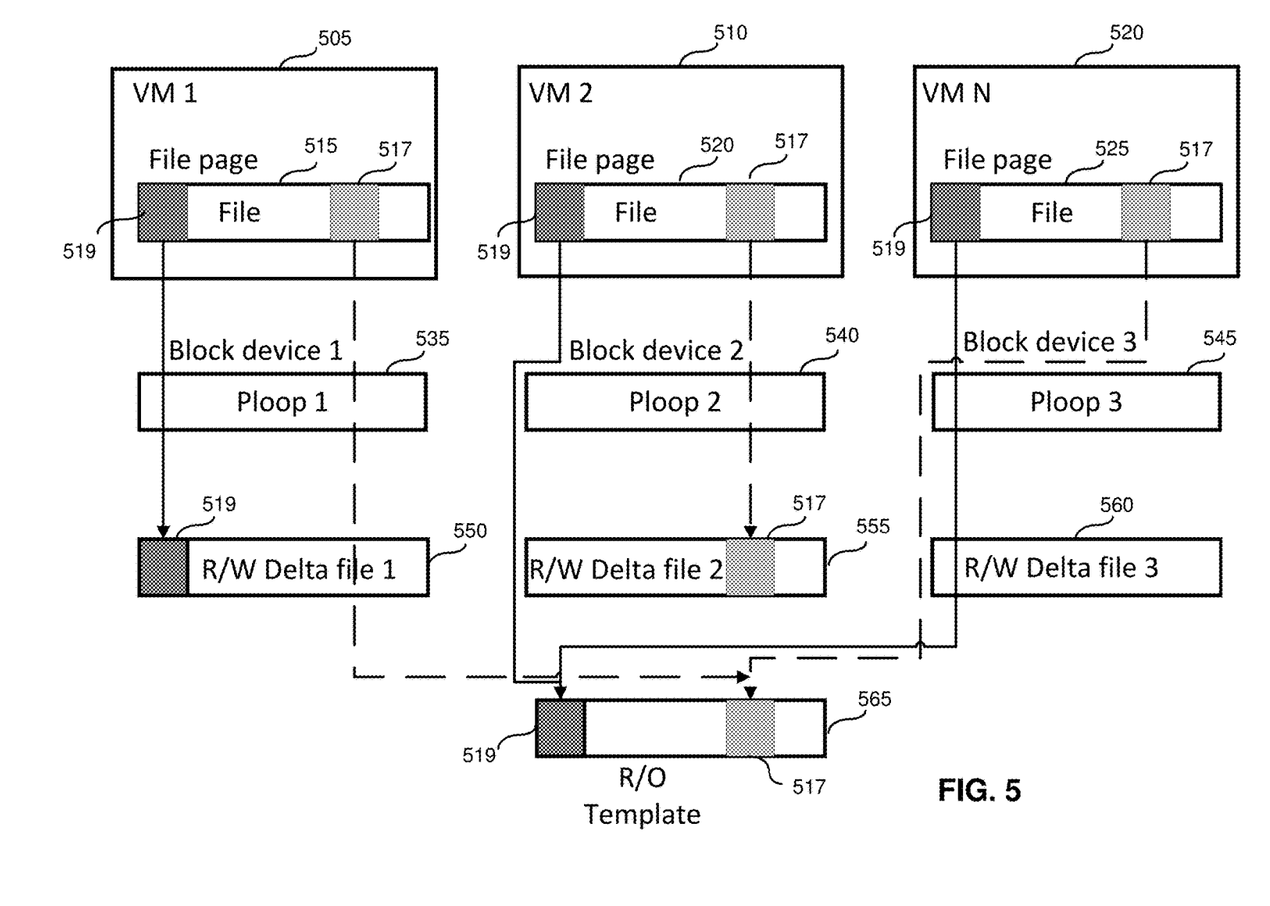
FIG. 5 illustrates that several templates can be used for different groups of VMs.

FIG. 5 illustrates that several hierarchical templates can be used for different groups of VMs. In FIG. 3 and FIG. 4 the ploop consisted of two parts (deltas): a read-write delta that was unique for each VM and a read-only template, which was shared between all the VMs. Ploop can have more complicated structure, for example several templates can be used for different groups of VMs. In this example, templates 565 and 570 are used for sharing the pages 417 and 419 among the VMs 505, 510 and 520.

The template 570 contains the full set of pages of the shared file, and is shared between all ploops. The template 565 contains pages that differ from corresponding pages from template 570 but are shared by VM 1 and VM 2. For example, if VM 1 (505) and VM 2 (510) modified the page 519 in the same way (so that pages 519 from file 515 and page 519 from file 520 are identical), then the modified page 519 is located in the template 565. In some aspects, the template 565 can be created by finding identical pages in R/W deltas 550 and 555. See, e.g., U.S. Pat. No. 9,286,310, incorporated herein in its entirety, for a discussion of template creation.

Ploops can have any hierarchical structure that will reflect to the relations (similarity) of the VMs. The structure of ploops even can be modified when VMs are running. Each ploop can have its own structure, and can include any of delta files. The delta files that are shared between ploops (i.e. contain pages, shared by VMs) are read-only (which mean that we cannot write to them, but can read and execute them) and are called templates. The deltas that are unique (belong to only one ploop, and contain unshared pages) are readwrite and are called R/W deltas.

In the situation depicted in the figure FIG. 5, ploop 1 (535) of VM 1 (505) consists of R/W delta 550, R/O template 565 and R/O template 570. Ploop 2 (540) of VM 2 (510) consists of R/W delta 555, R/O template 565 and R/O template 570. Ploop 3 (545) of VM 3 (520) consists of R/W delta 560 and R/O template 570 (it does not include R/O template 565).

If any VM attempts to address any page of the shared file, the page is looked for in the ploop according to the hierarchy of deltas. First in R/W delta, then in the top level template (which is the smallest usually), and then in the lowest level template (which usually is the biggest one). If the system finds the needed page in one delta file, it uses this page, and do not go to delta files which lay lower in the hierarchy.

For example, if the VM 1 (505) tries to address (read, execute, etc.) page 519 of file 515 then the system will look for this page in the R/W delta (550), then will look for and find the page in R/O template 565. So the VM 1 will use the page 519 from file 565 and will not use the page 519 from file 570.

For example, if the VM 2 (510) tries to address the page 517 it will look for it in the R/W delta 555, then in R/O template 565 and then will find it R/O template 570. So VM 2 (510) will use page 517 from file 570.

For example, if the VM 3 (520) tries to address the page 519 it will look for it in the R/W delta 560, then will find it R/O template 570. So VM 3 will use page 519 from file 570.

In the case of any VM attempt to write to any page, if this page is located in R/W delta, the page is unique and VM can write to it. If the page is not in R/W delta, then the system finds it in R/O templates (as was described above) and then the page is copied to the R/W delta. Then VM uses that copy from R/W delta and can write to it.

Figure 6:
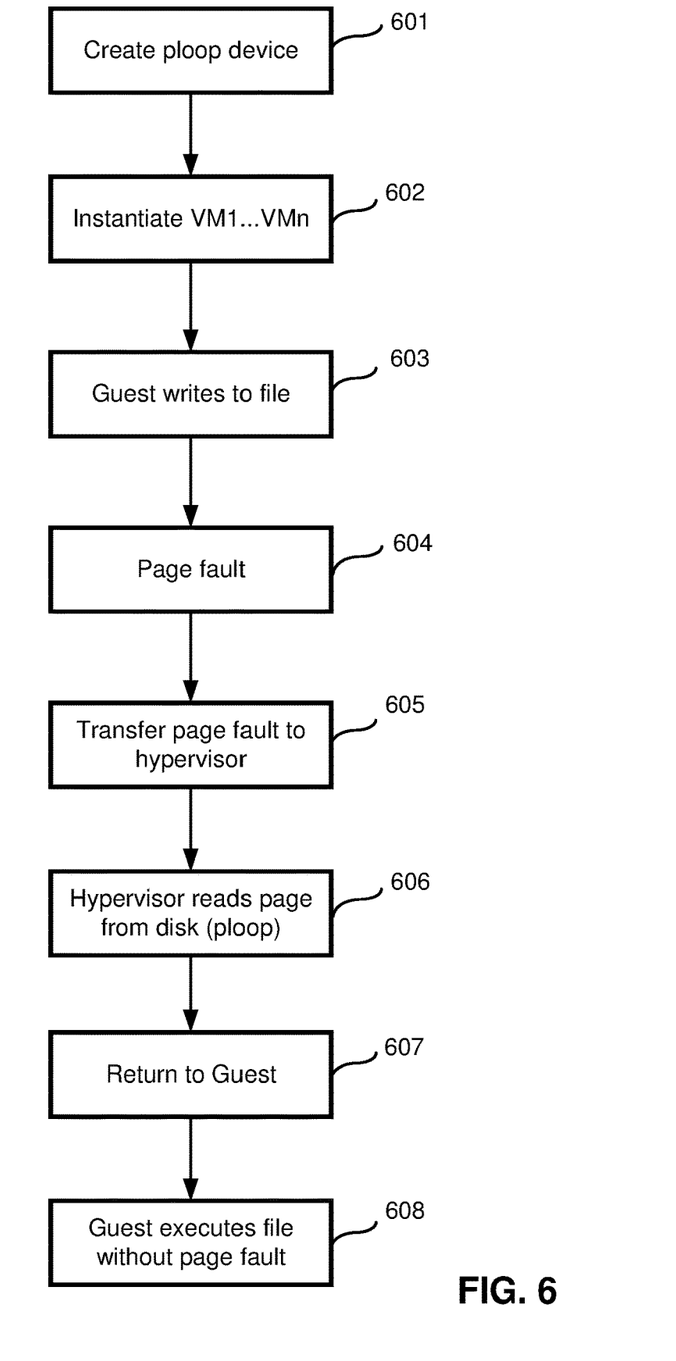
FIG. 6 illustrates a flow chart of handling write operations to a page of the shared file, in accordance with the exemplary embodiment.

FIG. 6 illustrates a flow chart of handling write operations to a page of the shared file, in accordance with the exemplary embodiment. In step 601 a ploop device is created and different VMs are instantiated in step 602 using this ploop device. Each VM has its own plop device. The VMs operate as usual until one of the VMs wants to write to the file that is shared between the VMs in step 603. Because the writes to this file are prohibited, the page fault occurs in step 604. Processing of the page fault is implemented as follows: the page fault is transferred to a hypervisor in step 606, and the hypervisor reads the page from disk (from the ploop, in some embodiments) in step 606 and the guest is provided with a copy of the original page. Then, control is returned to the guest in step 607. Subsequently, the guest executes writes to this file without page faults in step 608. Thus, the page, instead of being anonymous, is tied to the R/W delta by the hypervisor.

Figure 7:
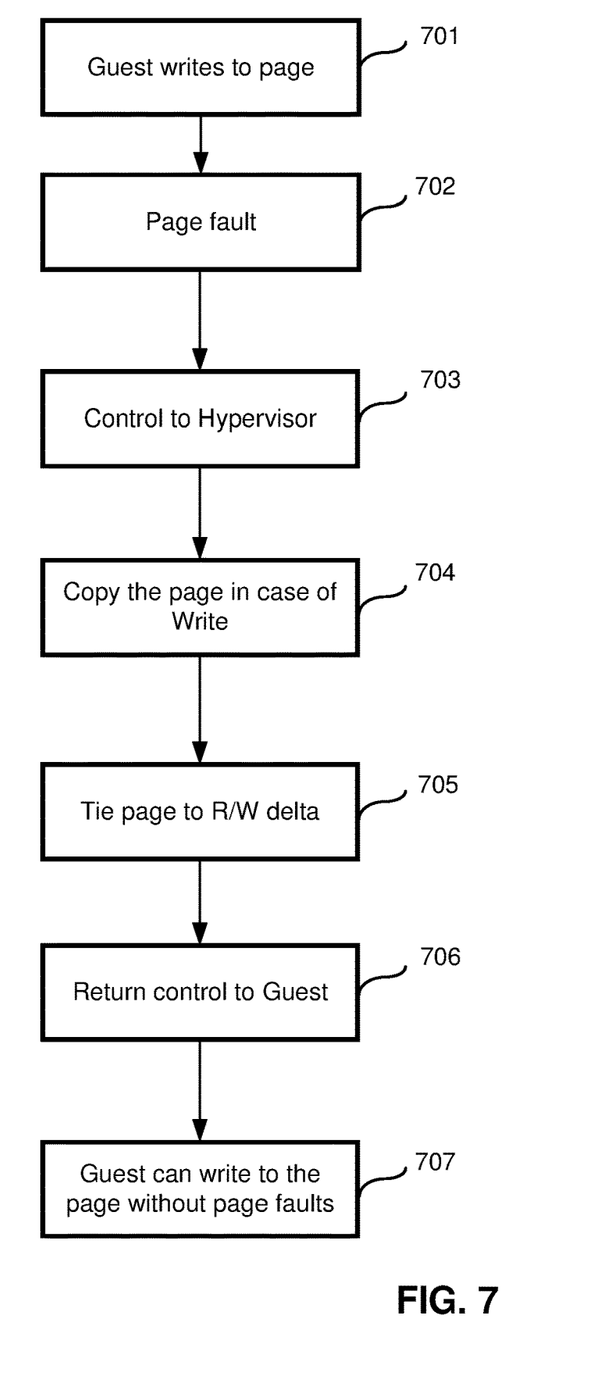
FIG. 7 illustrates a flow chart of handling write operations to a page of the shared file using a read/write delta, in accordance with the exemplary embodiment.

FIG. 7 illustrates a flow chart of handling write operations to a page of the shared file using read/write delta, in accordance with the exemplary embodiment. When a Guest writes to a page (any of pages of the file shared between VMs) is step 701, the page fault occurs in step 702 and the control is transferred to the hypervisor in step 703. Then, the hypervisor handles the page fault as follows: copies the page in case of write in step 704, and ties the page to R/W delta in step 705. With these two steps, a new physical page is allocated in the memory, which is a copy of the page in the template. This new page is not write-protected and is mapped to R/W delta in step 705. Note that in the conventional systems such pages became anonymous. Then, the control is returned to the guest in step 706. After that, the guest can write to the page without page faults in step 707, and using execution-in-place to prevent the guest from making a copy of the page, that allows code execution and page faults without an intermediate buffer cache. Another important feature of the exemplary method is that after the guest is halted, all changes to that page and that file are saved, although they do not affect any other VMs.

Figure 8:
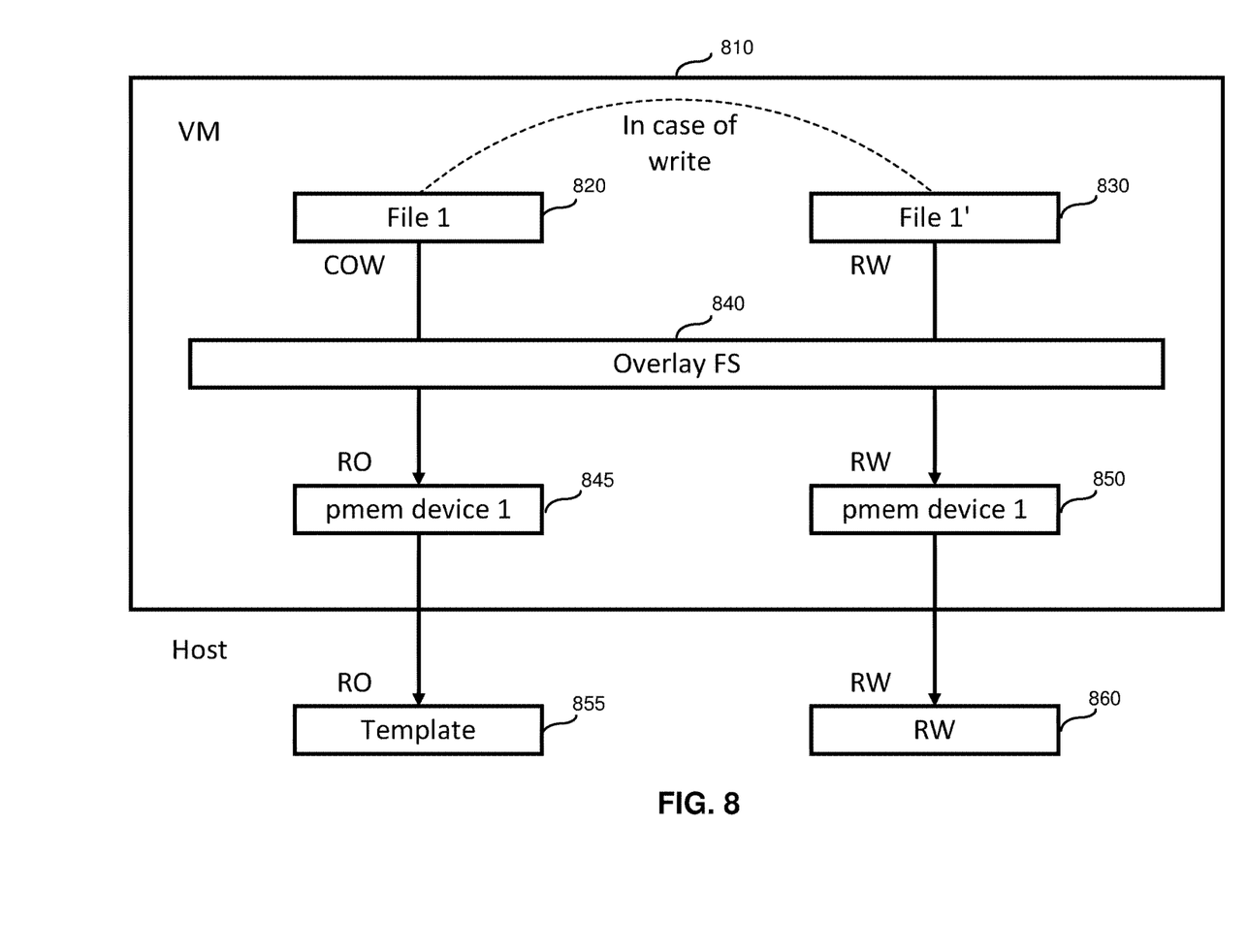
FIG. 8 illustrates system architecture, in accordance with the another exemplary embodiment.

FIG. 8 illustrates system architecture, in accordance with another exemplary embodiment. VM 810 runs on a host. In this example the VM has two files. File 1 (820) has a copy-on-write setting. In case of write operation, the file 820 is copied into a read/write (RW) file 1' (830). The file 830 is saved (as RW file) into a persistent memory block device 850 over an overlay file system 840. So, the RW file 860 can be used by the guest. If no write operation occurs, the file 820 remains in the guest as a read-only file (template) and remains stored in the persistent memory block device 845 over an overlay file system 840. The file 820 is stored in the host as a read-only template 855.

Thus, unlike conventional schemes, the VM file system is persistent—that is, the properties of the guest file system are retained, even after the guest is stopped, and any changes are preserved despite the stop, including preserving the hierarchy of templates.

Figure 9:
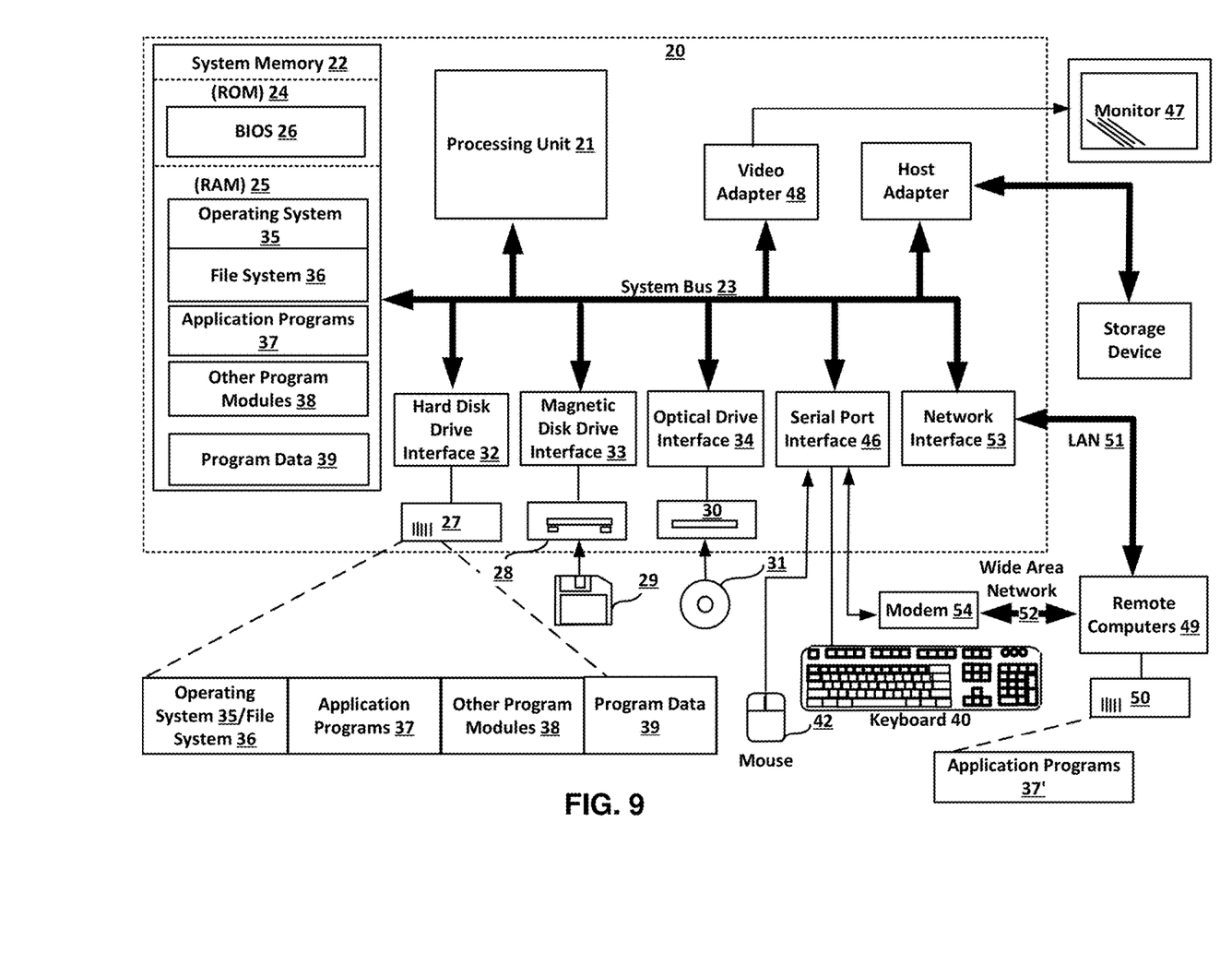
FIG. 9 illustrates a schematic of an exemplary computer system that can be used for implementation of the invention.

With reference to FIG. 9, an exemplary system for implementing the invention includes a general purpose computing device in the form of a computer system 210 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 210 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 210.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 210 includes a file system 36 associated with or included within the operating system 35, one or more application programs 37, other program modules 38 and program data 39. A user may enter commands and information into the computer 210 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 210 may operate in a networked environment using logical connections to one or more remote computers 49. The remote computer (or computers) 49 may be another computer, a server, a router, a network PC, a peer device or other common network node, and typically includes many or all of the elements described above relative to the computer 210, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 210 is connected to the local network 51 through a network interface or adapter 53. When used in a WAN networking environment, the computer 210 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 210, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A system for memory management for Virtual Machines (VMs), the system comprising:
    a host computer system running a host operating system (OS);
    at least two Virtual Machines (VMs) running on the host computer system, wherein each of the VMs has a Guest OS supporting a guest file system with execution-in-place that allows code execution without an intermediate buffer cache;
    a hypervisor configured to control the VMs; and
    a thin provisioning block device configured to store shared pages and formed of at least one delta file, wherein:
        the hypervisor is configured to receive a page fault;
        the hypervisor is configured to read the shared pages from the thin provisioning block device; and
        the Guest OS executes the one delta file that is stored on the thin provisioning block device.

2. The system of claim 1, wherein any delta files that are unique for the particular thin provisioning block device include unshared pages and represent read/write delta files.

3. The system of claim 1, wherein the thin provisioning block device provides a translation for a page access from any read/write delta file stored on the thin provisioning block device or from a read-only template.

4. The system of claim 1, wherein the each VM has a corresponding thin provisioning block device.

5. The system of claim 1, wherein the thin provisioning block device is a union of several delta files, wherein at least one of the several delta files is a read-only delta file, and at least one of the several delta files is a read/write delta file.

6. The system of claim 5, wherein the read-only delta file is shared by multiple thin provisioning block devices of different VMs, and wherein the delta file includes templates that contain pages that are shared by the different VMs.

7. The system of claim 6, wherein a VM can write to unshared pages, and when the VM attempts to write to a shared page, that page is copied from a read-only template to the read/write delta file, and the VM writes to the copy from the read/write delta file.

8. The system of claim 1, wherein the Guest OS executes the one delta file without the intermediate buffer cache for the page fault.

9. A computer-implemented method for managing memory in Virtual Machines (VMs), the method comprising:
    creating a thin provisioning block device on a host, wherein the thin provisioning block device is configured to store shared pages and is formed of at least one delta file;
    instantiating at least two VMs on the host;
    starting Guest OSs on the VMs, each Guest OS supporting a guest file system with execution-in-place that allows code execution without an intermediate buffer cache;
    writing to a shared file by one of the Guest OSs;
    processing a page fault;
    transferring the page fault to a hypervisor;
    reading the shared pages from the thin provisioning block device;
    returning control from the hypervisor to the Guest OS; and
    executing the shared file that is stored on the thin provisioning block device.

10. The method of claim 9, further comprising reading the shared pages from a disk by the hypervisor.

11. The method of claim 9, further comprising:
    copying the shared pages by the hypervisor in case of a write;
    linking the shared pages to a read/write delta file; and
    making a copy of the written page to the read/write delta file on a host disk space.

12. The method of claim 9, wherein the reading of the shared pages from the thin provisioning block device comprises reading the shared pages from a read/write delta file.

13. The method of claim 9, wherein the reading of the shared pages from the thin provisioning block device comprises reading the shared pages from a read-only template.

14. The method of claim 9, wherein the thin provisioning block device is a ploop device.

15. The method of claim 9, wherein the executing the shared file is performed without the intermediate buffer cache that corresponds to the page fault.

16. A computer program product comprising non-transitory computer readable media containing code for performing the steps of:
    creating a thin provisioning block device on a host, wherein the thin provisioning block device is configured to store shared pages and is formed of at least one delta file;
    instantiating at least two VMs on the host;
    starting Guest OSs on the VMs, each Guest OS supporting a guest file system with execution-in-place that allows code execution without an intermediate buffer cache;
    writing to a shared file by one of the Guest OSs;
    processing a page fault;
    transferring the page fault to a hypervisor;
    reading the shared pages from the thin provisioning block device;
    returning control from the hypervisor to the Guest OS; and
    executing the shared file that is stored on the thin provisioning block device.

* * * * *